(12) United States Patent
Penny et al.

(10) Patent No.: US 6,189,303 B1
(45) Date of Patent: Feb. 20, 2001

(54) METHOD OF DESTROYING AQUATIC VEGETATION

(75) Inventors: David M. Penny, Lawrence; Kenneth F. Knapp, DeSoto; Gerald S. Harvey, Lawrence, all of KS (US)

(73) Assignee: The Master's Dredging Company, Inc., Lawrence, KS (US)

( * ) Notice: Under 35 U.S.C. 154(b), the term of this patent shall be extended for 0 days.

(21) Appl. No.: 09/599,340

(22) Filed: Jun. 22, 2000

Related U.S. Application Data

(63) Continuation of application No. 09/167,911, filed on Oct. 7, 1998, now Pat. No. 6,116,004.

(51) Int. Cl.⁷ .................................................. A01D 44/00
(52) U.S. Cl. .................................................................. 56/8
(58) Field of Search ........................... 56/8, 9; 440/79; 114/61.1; 37/345

(56) References Cited

U.S. PATENT DOCUMENTS

| | | | |
|---|---|---|---|
| 2,739,435 | * | 3/1956 | Wiser .................................. 56/8 |
| 3,130,531 | * | 4/1964 | Wholeslagle ........................ 56/8 |
| 3,477,213 | * | 11/1969 | Just et al. ............................ 56/9 |
| 3,499,271 | * | 3/1970 | Drigert et al. ...................... 56/8 |
| 5,330,639 | * | 7/1994 | Murphree ........................ 210/170 |
| 5,542,240 | * | 8/1996 | Snider et al. ........................ 56/8 |
| 5,603,204 | * | 2/1997 | HarveyRioux et al. ............. 56/9 |

\* cited by examiner

Primary Examiner—Sherman Basinger
(74) Attorney, Agent, or Firm—Hovey, Williams, Timmons & Collins

(57) ABSTRACT

An aquatic vegetation shredder includes a double hull watercraft, with a space being defined between the hulls. The machine also includes an aquatic vegetation shredding assembly mounted to the watercraft adjacent the bow end, and a pair of propellers rotatably mounted to the watercraft adjacent the stem end. The propellers are configured to propel the watercraft through the water and draw water through the space defined between the hulls. Such a design causes the vegetation to be drawn toward the vegetation shredding assembly, while preventing the shredded vegetation from accumulating at the assembly; thereby eliminating the need for feeding devices for feeding the vegetation to the shredding assembly and discharge chutes for discharging the shredded vegetation away from the assembly. In addition, the propellers are operable to shred vegetation, thereby ensuring destruction of vegetation below the water surface and further commination of vegetation received from the shredding assembly. These features cooperatively provide a low displacement vessel that is particularly effective in shallow water environments.

11 Claims, 4 Drawing Sheets

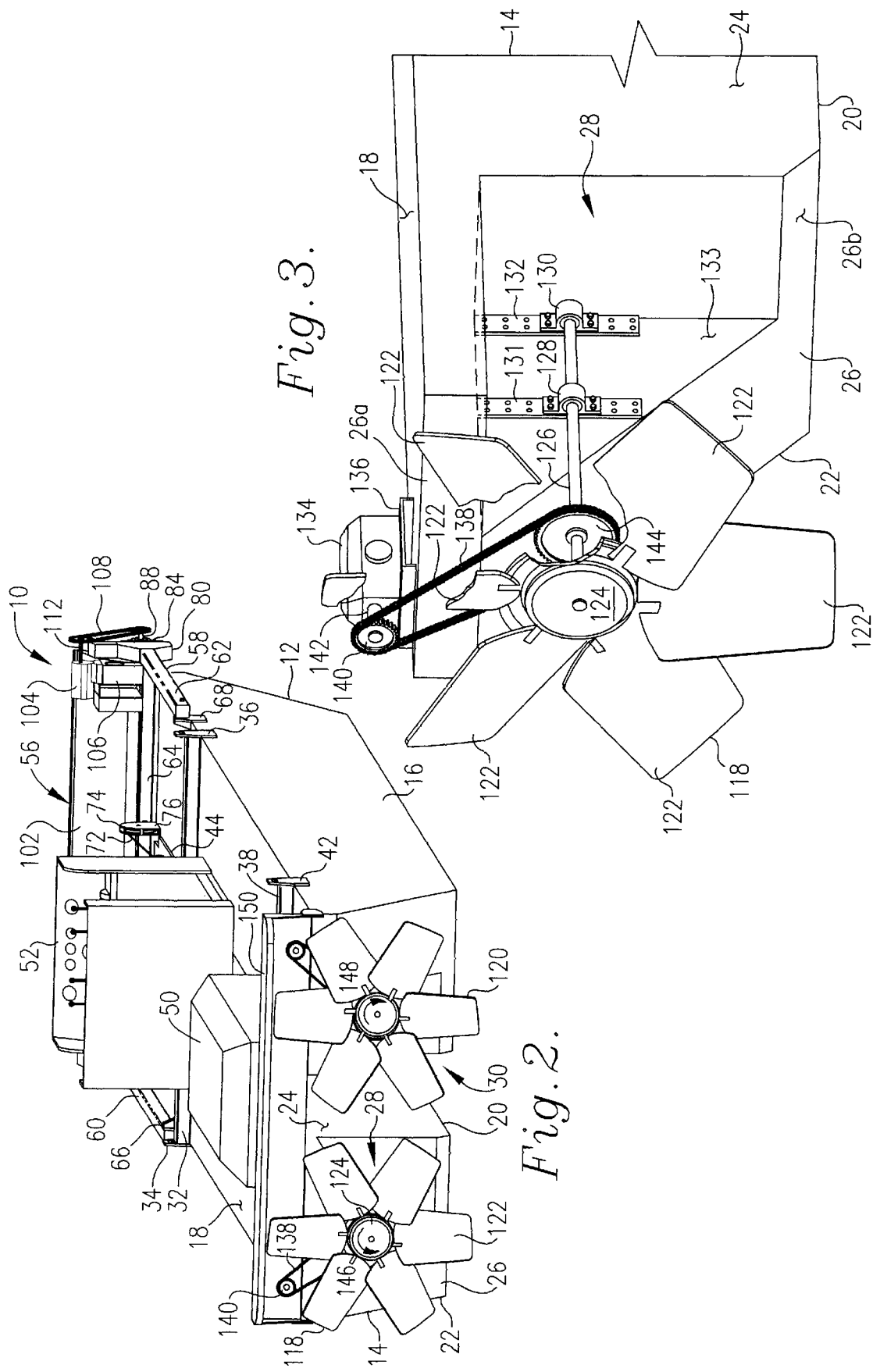

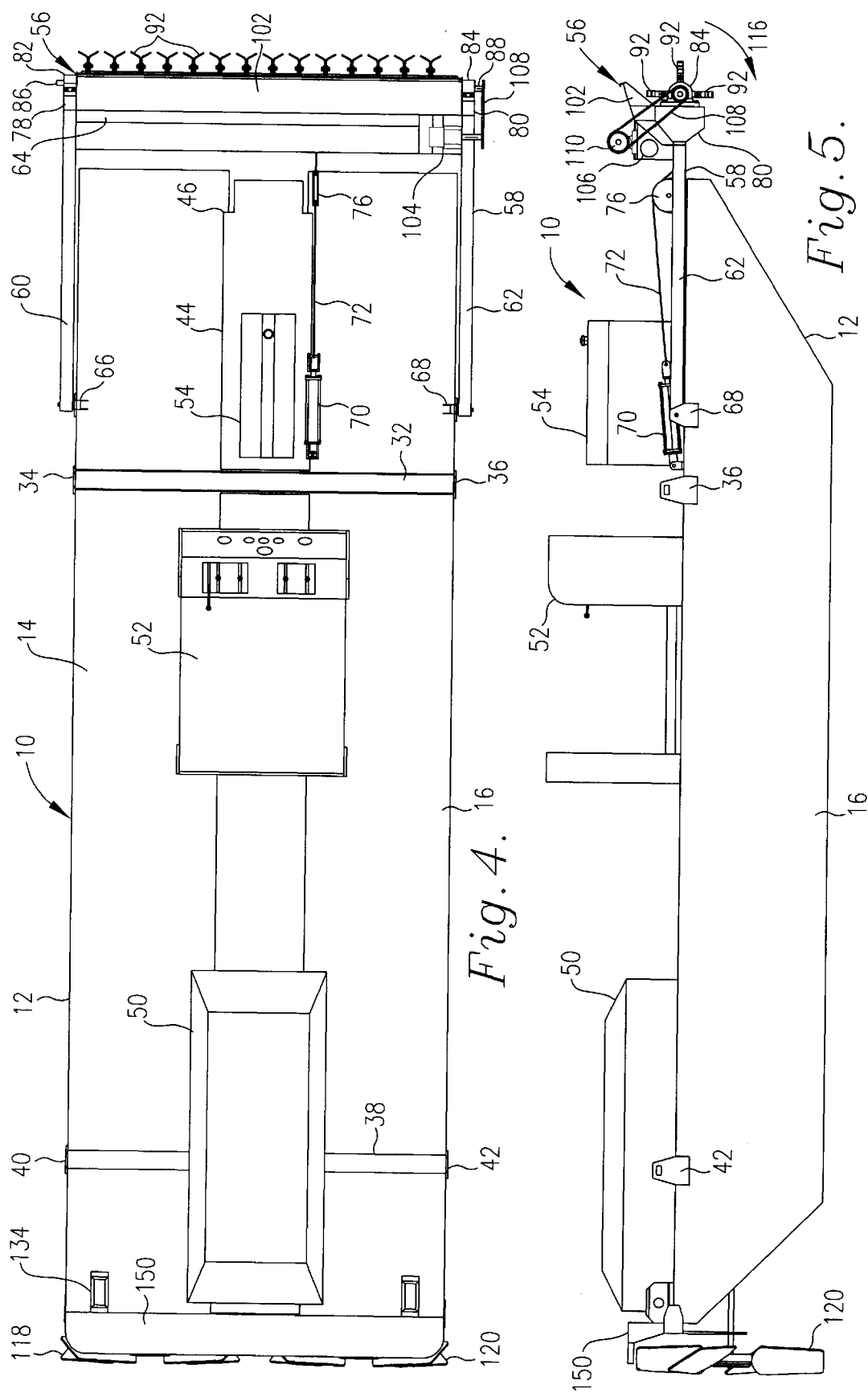

METHOD OF DESTROYING AQUATIC VEGETATION

RELATED APPLICATION

This is a continuation of application Ser. No. 09/167,911 filed Oct. 7, 1998 now U.S. Pat. No. 6,116,004.

BACKGROUND OF THE INVENTION

1. Field of the Invention

The present invention relates generally to equipment for shredding, harvesting, destroying or otherwise processing aquatic vegetation. More specifically, the present invention concerns an improved aquatic vegetation shredder that is more effective in destroying troublesome vegetation and versatile than most conventional devices.

2. Discussion of Prior Art

Aquatic vegetation can be devastating to both marine operations and the aquatic ecosystem. Unfortunately, most conventional expedients are ineffective in destroying or otherwise controlling such vegetation. These problems have previously been identified in our co-pending application for U.S. patent Ser. No. 08/993,072, filed Dec. 18, 1997, entitled APPARATUS FOR DESTROYING AQUATIC VEGETATION, assigned of record to the assignee of the present invention and now U.S. Pat. No. 6,023,920.

Our prior invention addresses these problems by providing, among other things, a design that is particularly successful in delivering vegetation to the shredding assembly. Accordingly, the vegetation is not simply pushed by the vessel as it moves through the body of water, nor does the vegetation pass around or under the vessel without being shredded. Our prior inventive design is also particularly useful in destroying aquatic vegetation without requiring removal of the vegetation from the body of water. That is to say, with our prior invention, the shredded vegetation is left in the body of water, with a minimum risk of regrowth. We have now determined that, in some instances, it would also be beneficial to have an aquatic vegetation shredder that is designed for shallow water, as well as deep water. It is also highly desirable to provide an aquatic vegetation shredder with means for shredding vegetation both generally at the water surface and well below the water surface to ensure that virtually all, or at least most, of the plant is shredded.

OBJECTS AND SUMMARY OF THE INVENTION

Responsive to these and other problems, an important object of the present invention is to eliminate the troubles presented by aquatic vegetation, as noted in our prior application. Particularly, an important object of the present invention is to provide a machine for destroying a dense, entangled mass of aquatic vegetation so as to improve marine navigation and reduce the risk of damage to the aquatic ecosystem. It is also an important object of the present invention to provide a machine for destroying aquatic vegetation that does not require the use of chemical or biological agents. Another important object of the present invention is to provide a machine that is particularly effective in presenting the vegetation to the shredder assembly and in destroying the vegetation without requiring removal of the vegetation from the water. In particular, it is an important object of the present invention to provide such a machine that is also designed for shallow water, as well as deep water. Yet another object of the present invention is to provide an aquatic vegetation shredder with means for shredding vegetation both at the water surface and well below the surface.

In accordance with these and other objects evident from the following description of the preferred embodiment, the present invention concerns an aquatic vegetation shredder including a double hull watercraft, with a space being defined between the hulls. An aquatic vegetation shredding assembly is mounted to the watercraft adjacent the bow end, and a pair of propellers are rotatably mounted to the watercraft adjacent the stern end. More importantly, the propellers are configured to propel the watercraft through the water and draw water through the space defined between the hulls. Such a design causes the vegetation to be drawn toward the vegetation shredding assembly, while preventing the shredded vegetation from accumulating at the assembly; thereby eliminating the need for feeding devices for feeding the vegetation to the shredding assembly and discharge chutes for discharging the shredded vegetation away from the assembly. In addition, the propellers are operable to shred vegetation, thereby ensuring destruction of vegetation below the water surface and further commination of vegetation received from the shredding assembly. These features cooperatively provide a low displacement vessel that is particularly effective in shallow, as well as deep, water environments.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 2 is a rear perspective view of the machine shown in FIG. 1, particularly illustrating the space between the hulls of the boat and the large propellers mounted to the hulls;

FIG. 3 is an enlarged, fragmentary perspective view of the stem end of the starboard hull, particularly illustrating the structure for adjustably mounting the propeller to the hull, the drive mechanism for the propeller, and the recess defined in the hull immediately forward of the propeller;

FIG. 4 is a top plan view of the machine;

FIG. 5 is a side elevational view of the machine; and

DETAILED DESCRIPTION OF THE PREFERRED EMBODIMENTS

Figure 1:
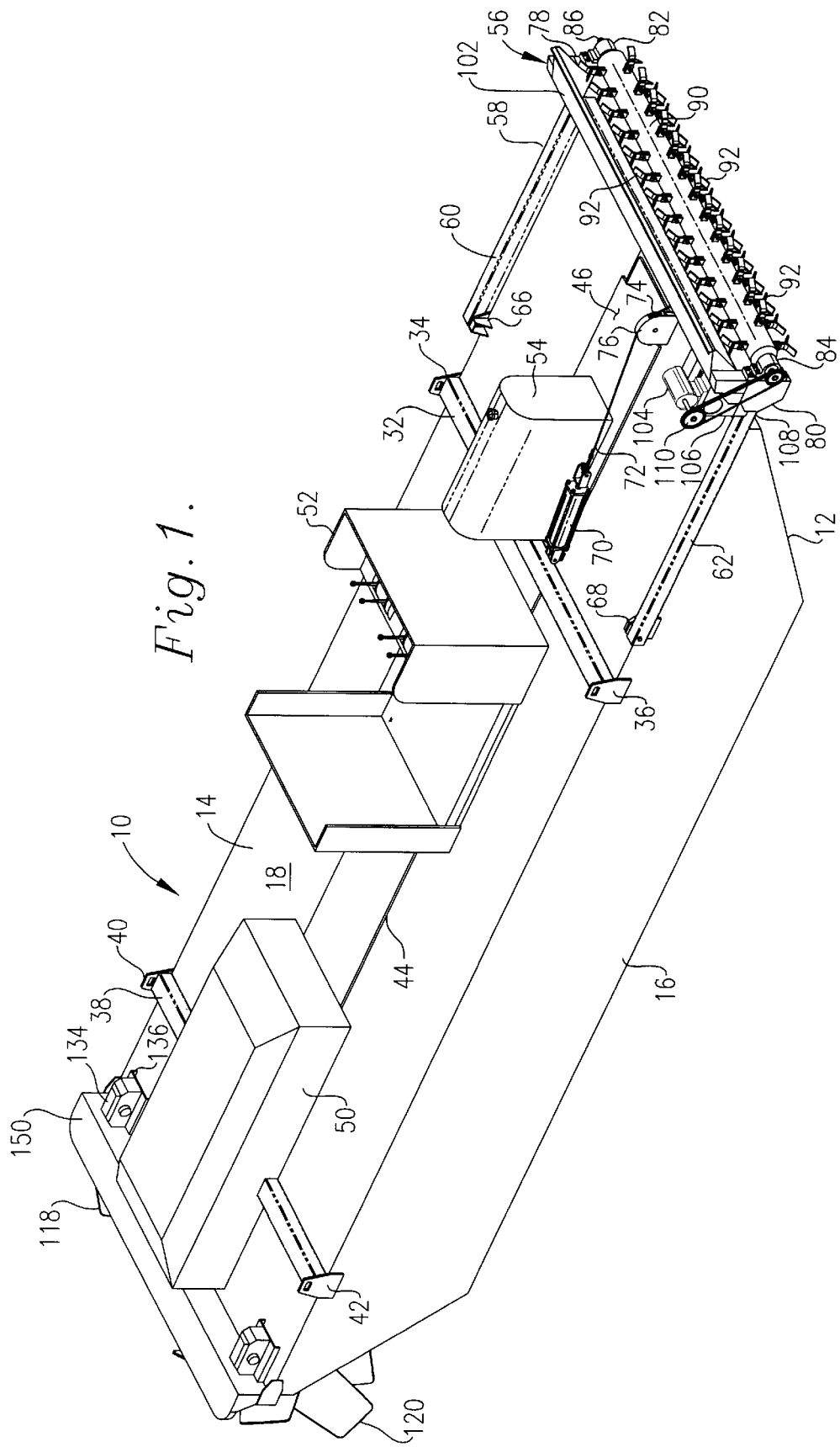
FIG. 1 is a perspective view of an aquatic vegetation shredder constructed in accordance with the principles of the present invention.
Figure 6:
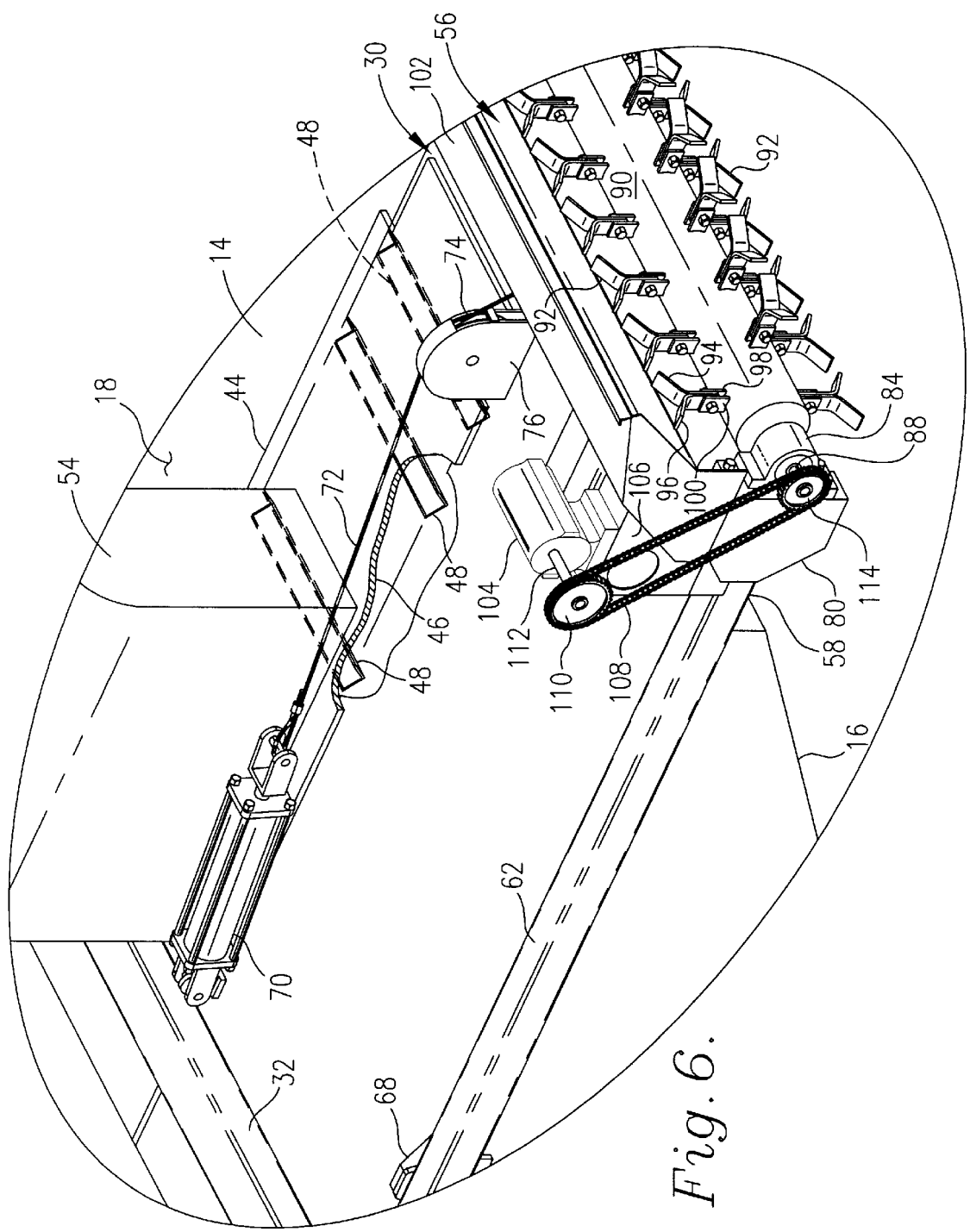
FIG. 6 is an enlarged, fragmentary perspective view of the bow end of the starboard hull, particularly illustrating the construction of the vegetation shredding assembly, and the decking spanning the space between the hulls.

Turning initially to FIG. 1, the aquatic vegetation shredder 10 selected for illustration includes a twin hull boat 12, with each hull 14 and 16 being generally identical in construction. For the sake of brevity only the port hull 14 will be described in detail, with the understanding that the starboard hull 16 is similarly constructed. As perhaps best shown in FIG. 3, the port hull 14 has a design similar to a barge-type vessel, with a pair of flat, substantially parallel top and bottom walls 18 and 20, respectively, and a pair of flat, substantially parallel outer and inner side walls 22 and 24, respectively. The stem wall 26 includes an upper section 26a that is perpendicular to the top wall 18 and a lower section 26b that extends downwardly and forwardly from the upper section 26a to the bottom wall 20. For purposes which will subsequently be described, a recess 28 extends inwardly from the inner side wall 24 and stem wall 26. Although not shown in detail, it will be appreciated that the bow wall includes an upper vertical section and a lower angled section similar to the stem wall 26. However, the bow end of the hull 14 does not include a recess as defined in the stem end.

Although the above-noted hull construction is preferred, it is entirely within the ambit of the present invention to utilize various other double hull boat designs. However, in any case, it is critical that a space be defined between the hulls, for purposes which will subsequently be described. In this respect, with the illustrated boat 12, the hulls 14 and 16 are spaced laterally apart (see FIG. 2) to define a space 30 between the inner side walls that has a lateral dimension slightly larger than half the width of each of the hulls. The space 30 extends along the entire length of the boat 12 and from the top walls to the bottom walls of the hulls.

The hulls 14 and 16 are maintained in the spaced apart relationship by a forward cross beam 32 extending laterally across the top walls of the hulls (see FIGS. 1–2,4 and 6). The cross beam 32 is fixed to the outer side walls of the hulls 14 and 16 by respective brackets 34 and 36, with each of the brackets including a hole for facilitating hoisting and land transport of the boat 12. A rear cross beam 38 is likewise secured to the hulls 14 and 16 by similar brackets 40 and 42. In addition, a decking 44 spans the space 30 defined between the hulls 14 and 16. The decking 44 includes a substantially flat plate 46 that marginally overlies the top walls of the hulls 14 and 16, and a plurality of spaced triangular-shaped braces 48 fixed to the underside of the plate 46 (see FIG. 6). The braces 48 preferably have a length corresponding to the lateral dimension of the space 30 so as to extend from the inner side wall of one of the hulls to the inner side wall of the other hull. If desired, the plate 46 and braces 48 may be secured (e.g., by welding) to the adjacent portions of the hulls. It will be noted that the illustrated decking is sectioned along the length of the boat, with spaces often being defined between adjacent sections of the decking. For example, the decking 44 does not extend underneath the cross beams 32 and 38, as perhaps best shown in FIG. 4. It will also be noted that the bow end of the flat plate 46 has been partially cut away so as to expose the underlying space 30.

Adjacent the stern end of the boat 12 is a cover 50 housing a power source (not shown) for providing operating power to the various components of the shredder 10. In the preferred embodiment, the power source includes an internal combustion engine (not shown) and a pressurized hydraulic power unit (not shown) drivingly connected to the engine. A suitable engine is available from General Motors Corporation as Model No. ZZ4, rated at 350 horsepower. The engine and hydraulic power unit are conveniently controlled from a cab 52 located generally at the center of the boat 12. In the illustrated embodiment, a fuel tank 54 for the engine is mounted to the decking 44 adjacent the bow end of the boat 12.

An aquatic vegetation shredding assembly 56 is mounted to the boat 12 at the bow end. In particular, a frame 58 swingably mounted to the boat 12 includes a pair of fore-and-aft arms 60 and 62 and a transverse bar 64 (see FIGS. 2 and 4) fixed between the arms 60,62 adjacent their forward ends. The arms 60 and 62 are pivotally attached to respective ones of the hulls 14 and 16 by brackets 66 and 68 (see FIGS. 1 and 4), and are disposed outwardly from the hulls 14,16 so as to permit swinging of the frame 58 below the top walls of the hulls 14,16. Swinging of the frame 58 is controlled by a double-acting hydraulic piston and cylinder assembly 70 pivotally mounted to the top wall of the starboard hull 16. A cable 72 is connected between the hydraulic assembly 70 and the transverse bar 64, such that the frame 58 swings downwardly as the assembly 70 extends and swings upwardly as the assembly 70 retracts. It will be noted that the cable 72 partially entrains a pulley 74 rotatably mounted to the starboard hull 16 by a stand 76.

At the forward ends of the arms 60 and 62 are a pair of enlarged supports 78 and 80 (see FIG. 4) for supporting respective bearing assemblies 82 and 84 (see also FIG. 1). The bearing assemblies 82 and 84 journal respective stub shafts 86 and 88 that cooperatively support a cylindrical drum 90 therebetween, whereby the drum 90 is rotatably supported between the arms 60 and 62. A plurality of knives 92 are swingably supported on the drum 90 similar to a conventional flail-type cutter used in the agricultural industry. As perhaps best shown in FIG. 6, each knife 92 includes a pair of outwardly diverging blades 94 and 96 fixed to one another and pivotally mounted between a pair of posts 98 and 100 projecting radially from the drum 90. Although the blades 94 and 96 of the illustrated knives 92 are shown in a radial orientation, it will be appreciated that the blades 94 and 96 are free to pivot and therefore droop downwardly as a result of gravity when the drum 90 is stationary. It will also be noted that the knives 92 are arranged in rows spaced along the length of the drum 90, with each of the rows including a pair of knives mounted to the drum 90 in diametrically opposite locations. A shield 102 covers generally the upper rear quadrant of the drum 90 so as to prevent water and debris from being thrown toward the cab 52.

The drum 90 is driven by a reversible, variable speed hydraulic motor 104 mounted to the starboard side of the frame 58 adjacent the support 80 by a stand 106, although a pair of motors may be used to drive the drum 90, if desired. A chain and sprocket drive serves to couple the drum 90 to the motor 104. In particular, a chain 108 entrains a sprocket 110 mounted to the output shaft 112 of the motor 104 and extends downwardly and forwardly to entrain a sprocket 114 mounted to the stub shaft 88 (see FIG. 6). The sprocket ratios (i.e., relative sizes) maybe varied for adjusting the rotational speed of the drum 90. The hydraulic motor 104 is coupled to the power source via the cab 52 so that the operator may control driving power to the drum 90. Preferably, the drum 90 is driven in the direction of arrow 116 shown in FIG. 5, at a speed dependent upon the type of vegetation encountered. For example, when the illustrated flail-type shredding assembly 56 is used to destroy water hyacinth, the drum 90 is preferably rotated at approximately 1000 revolutions per minute. Additionally, the hydraulic piston and cylinder assembly 70 is extended to swing the frame 58 downwardly until the knives project approximately three (3) to four (4) inches below the water surface. The hydraulic piston and cylinder assembly 70 is similarly coupled to the power source via the cab 52, whereby the operator may similarly control swinging of the frame 58 from the cab 52.

However, it is entirely within the ambit of the present invention to utilize other variously constructed shredding assemblies. For example, the present invention contemplates the use of a shredding assembly having a plurality of laterally spaced circular blades (similar to the machine disclosed in our prior application).

In any case, it is important that the shredder 10 includes structure for drawing water through the space 30 and for providing additional commination of the vegetation. In the illustrated embodiment, this structure includes a pair of large, high speed propellers 118 and 120 rotatably mounted to the hulls 14 and 16, respectively. The propellers 118 and 120 are nearly identical in construction. Thus, for the sake of brevity, only the port propeller 118 will be described in detail herein with the understanding that the starboard propeller 120 is similarly constructed.

The propeller 118 includes six blades 122 projecting radially from a central hub 124 mounted to a rearwardly extending shaft 126. The illustrated propeller blades 122 are fixed at a thirty degree pitch, although a variable pitch propeller may be used, if desired. As shown in FIG. 3, the shaft 126 is journaled by a pair of bearing assemblies 128 and 130 adjustably mounted to respective vertical support plates 131 and 132. The support plates 131,132 are fixed to the recessed wall 133 of the port hull 114, and include a series of threaded holes into which fasteners are selectively inserted for fastening the bearing assemblies in an adjustable position. Accordingly, the propeller 118 rotates about a vertically shiftable fore-and-aft axis defined by the shaft 126. Those ordinarily skilled in the art will appreciate that other variously constructed structure may be utilized to permit depth adjustment of the propeller 118, such as a swingable frame similar to the frame 58 of the shredding assembly 56.

As perhaps best shown in FIG. 4, the diameter of the propeller 118 is greater than the width and height of the hull 14 (one suitable propeller diameter is approximately forty-eight inches). Moreover, the rotational axis (i.e., shaft 126) of the propeller 118 is located slightly closer to the inner side wall 24 than the outer side wall 22, such that the propeller 118 projects only slightly outwardly beyond the outer side wall 22 but well beyond the inner side wall 24. This configuration ensures that the propeller 118 effects water flow through the space 30, as will subsequently be described. Further, the propellers 118 and 120 cooperatively extend across the full width of the boat 12 (except for the small space defined therebetween) and project outwardly beyond the port and starboard sides. It may therefore be said that the propellers 118 and 120 are operable to chop vegetation across at least substantially the full width of the boat 12.

The propeller 118 is driven by a reversible, variable speed hydraulic motor 134 mounted to the top wall 18 of the port hull 14 by a generally U-shaped stand 136. In particular, the propeller 118 is drivingly connected to the motor 134 by a chain 138 entraining a sprocket 140 supported on the output shaft 142 of the motor 134 and a relatively larger sprocket 144 supported on the propeller shaft 126. The links of the chain 138 are preferably interconnected by cotter keys for providing quick and easy addition or subtraction of links, thereby facilitating adjustment of the chain length as the propeller 118 is moved up or down. The motor 134 is connected to the power source via the cab 52 so that the operator controls the speed and direction of the propeller.

In the illustrated embodiment, the propellers 118 and 120 are independently controllable so as to improve maneuverability. However, the term "independent" as used herein shall not be interpreted to mean that the propellers 118 and 120 must operate at different speeds or directions of rotation relative to one another, nor that the propellers cannot be operated simultaneously by suitable controls in the cab 52 that ensure the propellers rotate at the same speed and direction. In any case, the blades of the starboard propeller 120 preferably have the same degree of pitch as the blades of the port propeller 118, but are pitched in an opposite direction. Accordingly, when it is desired to propel the boat 12 in a forward direction, the propellers 118 and 120 are rotated in opposite directions as indicated by the arrows 146 and 148 in FIG. 2. The direction of rotation of both propellers 118,120 would be reversed when propelling the boat in the rearward direction. It will also be noted that the propellers 118,120 may be rotated at different speeds to turn the boat 12 in a direction opposite from the relatively faster turning propeller, and the propellers may be rotated in the same direction to perform a so-called "zero radius turn."

Although the illustrated propellers 118 and 120 are independently vertically adjustable, it is preferred that the propellers be at the same vertical location so as to have substantially the same or equal impact on operation. It will also be appreciated that the propellers 118,120 are depth adjustable for a variety of reasons. For example, in some plant environments, the shredding assembly 56 is incapable of projecting sufficiently below the water surface to destroy the vegetation. Accordingly, the propellers 118,120 can be positioned as low as necessary to shred the lower portions of plants. It is believed that the cutting action provided by the propellers 118,120 is primarily attributable to their multi-bladed, axial configuration and the relatively high speed (e.g., 350 revolutions per minute) at which they are rotated. On the other hand, in relatively shallow conditions, the propellers 118,120 may be raised, as necessary, to avoid interference with the bed yet still provide their intended chopping, water-drawing and propulsion functions. In the illustrated position, the propellers 118,120 project upwardly out of the water, which is particularly useful during rearward travel of the boat 12. Specifically, it is believed that vegetation is not likely to collect on the propellers 118,120 primarily because the propellers shed vegetation and water as they project upwardly out of the water.

A shroud 150 connected to the stern end of the hulls 14,16 projects rearwardly to overhang the portions of the propellers 118,120 projecting upwardly out of the water. Accordingly, the shroud 150 prevents water and vegetation from being thrown upwardly onto the boat 12 by the propellers 118,120. To accommodate vertical adjustment of the propellers, the shroud 150 may likewise need to be adjustably mounted to the hulls 14,16.

In use, the illustrated vegetation shredder 10 is designed for forward travel, with the shredding assembly 56 essentially cutting a path through the vegetation as the boat 12 is propelled through the water by the propellers 118,120. However, that is not to say that the shredder 10 is incapable of moving rearwardly through a vegetation infested body of water. In fact, when the boat 12 is moved in a rearward direction, the propellers 118,120 convey vegetation outwardly to the sides of the boat 12 so that the hulls 14,16 are able to move through the water without accumulating vegetation thereon. This is primarily attributable to the direction of rotation of the propellers and the pitch of the propeller blades. In addition, the vegetation is comminuted by the propellers, thereby cutting a path in the vegetation similar to the shredding assembly 56, as previously noted. Again, operation in the rearward direction is not likely to be affected, when the propellers 118,120 are in their illustrated positions, primarily because the propellers shed vegetation and water as they project upwardly above the water surface.

As noted above, when the boat 12 is propelled in the forward direction, the shredding assembly 56 is positioned so that the swingable knives 92 project several inches below the water surface. It has been determined that such a configuration ensures adequate comminution of surface plants to prevent regrowth. The vegetation shredded by the assembly 56 is either picked up by the spinning knives 92 and directed forwardly by the shield 102 or simply left in the water. As the boat 12 travels forwardly, the shredded vegetation in the water passes through the space 30 or around the outside of the hulls 14 and 16. It will be appreciated that movement of shredded vegetation through the space 30 is promoted by the propellers 118,120. In particular, the propellers 118,120 draw water rearwardly through the space 30 at a velocity greater than the forward speed of the boat 12. This is also important in drawing uncut vegetation toward the shredding assembly 56. It is believed that the "water-drawing" action of the propellers 118,120 is at least in part attributable to the fact that the propeller blades extend inwardly beyond the inner side walls of the hulls 14 and 16. The large size and high speed rotation of the propellers 118,120 are also believed, to contribute to the desired water-drawing action. It is also believed that this action of the propellers 118,120 is enhanced by the recesses defined in the stern ends of the hulls 14,16 (possibly as a result of the recesses serving a function similar to a plenum for a fan). Similar to the shredding assembly 56, the vegetation encountered by the propellers 118,120 is comminuted. In all most all cases, this will involve further shredding of vegetation previously processed by the shredding assembly 56, thereby providing dual-stage shredding of the vegetation. In addition, the propellers 118,120 will shred any material at the water surface which was not previously processed by the shredding assembly 56. The propellers 118,120 are also likely to draw vegetation from depths below the shredding assembly 56 and shred such vegetation. Moreover, the propellers 118,120 may be positioned at a depth to ensure shredding of vegetation at depths below the shredding assembly 56.

In any case, the large, high speed propellers 118,120 serve the triple purpose of propelling the boat 12, drawing water through the space 30, and chopping vegetation encountered by the propellers 118,120. As noted above, the water-drawing function promotes movement of the shredded vegetation around the hulls and also serves to draw uncut vegetation toward the shredding assembly 56. The vegetation chopping function of the high speed propellers 118,120 provides dual-stage comminution of the vegetation generally at the water surface, and shredding of vegetation below the shredding assembly 56 which might not otherwise be processed by the shredder 10. It will also be appreciated that the present invention also provides a design that is well-suited for shallow water conditions. The displacement of the illustrated shredder 10 is such that the boat 12 is operable in water depths as shallow as eighteen inches. It will be noted that the depth adjustability ofthe propellers 118,120 and the swingability of the frame 58 permits the propellers 118,120 and shredding assembly 56 to be positioned above the bottom of the hulls 14 and 16, as shown in the drawings, thereby ensuring operability in shallow water conditions.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A method of destroying aquatic vegetation, said method comprising the steps of:

(a) propelling a watercraft through the water;

(b) shreddiing vegetation across at least substantially The full width of the watercraft and forward of the bow end of the watercraft; and (c) chopping vegetation across at least substantially the full width of the watercraft and rearward of the stem end of the watercraft, step (c) including the stop of rotating a chopping element about a substantially horizontal axis to chop vegetation.

2. A method of destroying aquatic vegetation, said method comprising the steps of:

(a) propelling a watercraft through the water;

(b) shredding vegetation across at least substantially the full width of tile watercraft and forward of the bow end of the watercraft; and (c) chopping vegetation across at least substantially the full width of the watercraft and rearward of the stem end of the watercraft, steps (a) and (c) comprising a common step of rotating a plurality of propellers mounted to the watercraft rearward of the stem end, such that each propeller serves to chop vegetation and propel the watercraft.

3. An aquatic vegetation destruction method as claimed in claim 2, steps (a) and (c) including the step of vertically adjusting the position of at least one of the propellers.

4. An aquatic vegetation destruction method as claimed in claim 3, steps (a) and (c) including the step of rotating the propellers in opposite directions about respective fore-and-aft extending axes to effect forward or rearward movement of the watercraft.

5. An aquatic vegetation destruction method as claimed in claim 1, steps (a) and (c) being accomplished simultaneously by a common mechanism.

6. An aquatic vegetation destruction method as claimed in claim 1, step (b) including the step of shredding vegetation located generally above the water surface.

7. An aquatic vegetation destruction method as claimed in claim 6, step (b) including the step of chopping vegetation located generally below the water surface.

8. An aquatic vegetation destruction method as claimed in claim 1, step (a) including the step of propelling the watercraft in forward direction such that vegetation is first shredded and then chopped.

9. An aquatic vegetation destruction method as claimed in claim 1, step (b) including the step of rotating a laterally-extending shredding element.

10. An aquatic vegetation destruction method as claimed in claim 9, step (b) including the step of vertically adjusting the position of the shredding element.

11. An aquatic vegetation destruction method as claimed in claim 1, steps (b) and (c) including the step of operating respective mechanisms that each extend substantially the full width of the watercraft, such that each mechanism serves to create a swath that is generally at least as wide as the watercraft.

* * * * *